Nov. 30, 1948.      E. R. BREMER       2,455,037
LAWN WASHER AND SPRINKLER SUPPORT
Filed Feb. 15, 1946

INVENTOR.
Emil Robert Bremer
BY *Victor J. Evans & Co.*
ATTORNEYS

Patented Nov. 30, 1948

2,455,037

UNITED STATES PATENT OFFICE 2,455,037

LAWN WASHER AND SPRINKLER SUPPORT

Emil Robert Bremer, Alameda, Calif.

Application February 15, 1946, Serial No. 647,889

1 Claim. (Cl. 248—87)

The invention relates to a hose nozzle support, and more especially to a lawn washer and sprinkler device.

The primary object of the invention is the provision of the device of this character, wherein a sprinkling nozzle of a lawn hose can be supported and manipulated so that a lawn can be conveniently washed to remove leaves therefrom and sprinkled with ease and dispatch.

Another object of the invention is the provision of a device of this character, wherein a spray of water can be directed where desired, without requiring the manual holding of a lawn hose, the device being of novel construction and is unique in the use thereof.

A further object of the invention is the provision of a device of this character, which is simple in construction, thoroughly reliable and efficient for the purposes intended thereof, strong, durable, readily and easily handled and adjusted and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
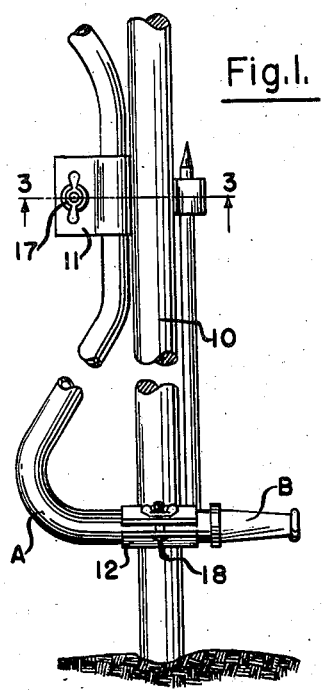
Figure 1 is an elevation of the device constructed in accordance with the invention and in one applied position.

Referring to the drawing in detail, A designates generally a portion of a garden or lawn hose, which is of the usual type, having at its discharge end an adjustable spray nozzle B, which also is of any ordinary construction and for association with these is the device constituting the present invention, as hereinafter described.

The device constituting the invention, comprises a straight stick 10 of any required length having secured thereto near one end of the same vertically spaced springy clamping clips 11 and 12 respectively, which are disposed at substantially right angles to each other on corresponding sides of said post, and their opening areas arranged in alignment and crosswise of the latter, that is to say the clip opens in alignment with the post and the clip 12 crosswise thereof.

Figure 2:
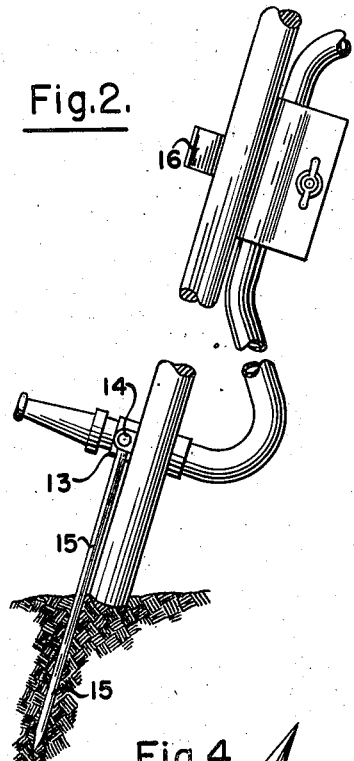
Figure 2 is a view similar to Figure 1 showing the device in another applied position.
Figure 3:
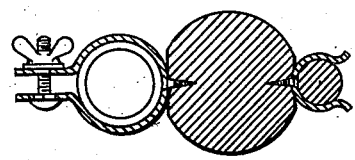
Figure 3 is a sectional view taken on the line 3—3 of Figure 1 looking in the direction of the arrows.
Figure 4:
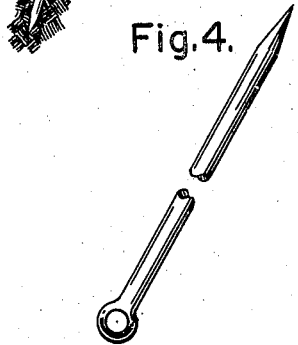
Figure 4 is a perspective view of the staking pin.
Figure 5:
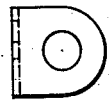
Figure 5 is a side view of the stake hanger detached.
Figure 6:
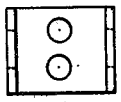
Figure 6 is an elevation of the hanger looking toward its open side.

On the post or stick 10 next to the clip 12 is a bearing 13 in which is pivoted at 14 a staking or anchoring pin 15, which in one position projects beyond the stick 10 so that it can be driven into the ground as shown in Figure 2 of the drawing or it can be swung up against the stick for detachable engagement in a keeper 16 thereon as worn by the stick, as is best seen in Figure 1 of the said drawing.

The hose A is fastened by a binding bolt 17 in the clip 11, while the nozzle B is fastened in the clip 12 by a binding bolt 18 and when the pin 15 is disused the stick is propped on the ground as shown in Figure 1 of the drawing and by hand manipulation of this stick the spray from the nozzle can be directed selectively for the washing of a lawn, as should be apparent. Now, when the pin 15 is anchored in the ground as shown in Figure 2 of the drawing the hose with its nozzle is supported for sprinkling purposes, the device being adapted for anchorage at any locality.

What is claimed is:

In a device of the class described, a hose receiving clamp fixed to a stick near the upper end thereof, a second hose receiving clamp fixed to the stick near the lower end thereof and arranged at right angles to the first clamp, a bearing fixed to the stick adjacent the lower clamp and at right angles thereto, a sticking pin pivotally connected to said bearing, and a keeper for the sticking pin fixed to the stick on a side opposite the first clamp to resiliently hold the sticking pin in an inoperative position.

EMIL ROBERT BREMER.

REFERENCES CITED

The following references are of record in the file of this patent:

UNITED STATES PATENTS

| Number | Name | Date |
|---|---|---|
| 883,969 | Meskill | Apr. 7, 1908 |
| 929,019 | Robinson | July 27, 1909 |
| 994,005 | Jones | May 30, 1911 |
| 1,829,621 | Whiteford | Oct. 27, 1931 |